United States Patent [19]

Thompson

[11] 4,104,480
[45] Aug. 1, 1978

[54] SEMICONDUCTIVE FILLING COMPOUND FOR POWER CABLE WITH IMPROVED PROPERTIES

[75] Inventor: Paul F. Thompson, Millington, N.J.

[73] Assignee: General Cable Corporation, Greenwich, Conn.

[21] Appl. No.: 739,315

[22] Filed: Nov. 5, 1976

[51] Int. Cl.² .............................................. H01B 7/28
[52] U.S. Cl. ................................. 174/23 C; 156/48; 174/107; 174/110 PM; 174/110 AR
[58] Field of Search .................. 174/23 R, 23 C, 107, 174/110 PM, 110 AR, 110 R, 110 B, 120 R, 120 AR, 120 SR, 120 SC, 102 SC, 36, 106 SC, 105 SC; 156/48; 29/624; 252/64, 63

[56] References Cited

U.S. PATENT DOCUMENTS

| 3,642,638 | 2/1972 | Kitano ................. 174/110 PM X |
| 3,671,663 | 6/1972 | Seifert et al. ......... 174/110 PM X |
| 3,697,670 | 10/1972 | Mitacek .................... 174/23 C X |
| 3,728,466 | 4/1973 | Rocton et al. ............... 174/23 R |
| 3,830,953 | 8/1974 | Wood et al. ................. 174/23 C |
| 3,885,085 | 5/1975 | Bahder et al. ................. 174/36 |
| 3,888,710 | 6/1975 | Burk ......................... 174/23 C |
| 3,943,271 | 3/1976 | Bahder et al. ................ 174/23 R |

FOREIGN PATENT DOCUMENTS 1,203,138  8/1970  United Kingdom ................. 174/23 C Primary Examiner—Arthur T. Grimley
Attorney, Agent, or Firm—Roy C. Hopgood; John M. Calimafde; Charles W. Neill

[57] ABSTRACT

This invention is an improved filling compound for preventing moisture penetration along the interior of high voltage electric power cables. Amorphous polypropylene, mixed with carbon where it must be semiconductive, is an extremely good filling compound because of its electrical characteristics and also because of its good flow characteristics when extruding. When the cable is to be used under conditions where it must withstand temperatures so low that the polypropylene becomes brittle, it can be blended with polyisobutylene rubber to withstand lower temperatures, but the blend must be kept within limits to prevent loss of the good flow characteristics of the amorphous polypropylene.

13 Claims, 2 Drawing Figures

CORRUGATED METAL SHIELD

48 — METAL SHIELD
50 — ISOBUTYLENE RUBBER COMPOUND

SEMICONDUCTIVE FILLING COMPOUND FOR POWER CABLE WITH IMPROVED PROPERTIES

BACKGROUND AND SUMMARY OF THE INVENTION

Filling compounds are used in high voltage power cables to prevent moisture from travelling along the interior of the cable core; for example, between the conductor and the insulation or between the insulation and metal shielding. High voltage power cables have layers of semiconducting plastic material on both the inner and outer surfaces of the insulation. The layer between the conductor and the insulation is commonly referred to as the "conductor shield"; and the layer between the insulation and the metal shield is referred to as the "insulation shield."

Filling compounds are most commonly used to seal the cable between the conductor and the conductor shield. With stranded conductors, the sealing compound can be applied between the strands of the conductor. The semiconducting filling compound of this invention can be applied over the conductor in such a way as to provide not only a sealant but also to serve as the conductor shield. It can also be applied between the insulation and the metal shield which surrounds the insulation.

It is extremely important to have a filling compound which has good flow characteristics which permit the compound to be extruded over the surface which it surrounds without forming any voids or other variations in the extruded layer. Voids or other irregularities cause localized concentration of electrical stress, and such stress concentrations often result in the formation of electro-chemical trees, if there are traces of moisture present. Over a period of time, electrochemical trees cause deterioration and eventual breakdown of the insulation.

Amorphous polypropylene has unusually good flow characteristics when extruded on an underlying surface in the manufacture of high-voltage power cables. Additions of carbon black sufficient to obtain a satisfactory semiconducting blend do not impair the flow characteristics.

The only disadvantage that has been found in the use of amorphous polypropylene has been that it becomes brittle at temperatures below 0° C. The compound can be made to withstand lower temperatures without becoming brittle if the amorphous polypropylene is blended with limited amounts of a low molecular weight polyisobutylene rubber or with a low molecular weight copolymer of isobutylene-isoprene rubber.

Where the brittleness of the compound at low temperatures is not a factor to consider, the amorphous polypropylene is used without blending in any other material except as much carbon as is necessary for the desired conductivity where a semiconducting filler is desirable. Carbon black or powdered graphite can be used to make the compound semiconducting. The amount of carbon required for semiconducting shields of high-voltage power cables does not impair the flow characteristics of the amorphous polypropylene to any significant extent.

When it is necessary to have the filler compound of this invention withstand lower temperatures, without becoming brittle, the amorphous polypropylene is blended with as much low molecular weight polyisobutylene rubber as is necessary to permit the filler to withstand lower temperatures. A blend of amorphous polypropylene and low molecular weight polyisobutylene rubber in equal parts by weight enables the filler compound to withstand a temperature as low as −11° C.

The preferred blend, for low temperature work, is 37½% amorphous polypropylene and 62½% low molecular weight polyisobutylene rubber. This gives a brittle point of −16° C. With an additional 10 parts of hydrocarbon oil, the blend has a brittle point of −22.8° C.

Further reduction of the amount of amorphous polypropylene in the compound impairs the flow characteristics and, if the proportions of amorphous polypropylene to polyisobutylene rubber is reduced below a ratio of 25 to 75, it becomes necessary to add a processing aid to the blend in order to maintain satisfactory flow characteristics for the compound. Various plasticizers can be used as a processing aid, such as hydrocarbon oil, chlorinated paraffin, isobutylene, liquid plasticizer, or low molecular weight polyethylene. The amount of processing aid added to the blend should be limited to that necessary to restore the good flow characteristics of the blended material.

The amorphous polypropylene is preferably used without blending in other polymers, as previously explained, but whether used alone or in a blend, the amount of carbon black or graphite material used to make the polymer semiconducting may be within the range of from 40 to 150 parts of carbon to 100 parts of the polymer, whether amorphous polypropylene is used alone or blended with other materials, as already described. All mixture ratios as described herein are by weight.

The filler compound of this invention retains its adhesiveness, consistency and resistivity, as demonstrated by long term oven aging at 121° C. It retains its moisture resistance after long term water immersion at 80° C; is nondripping at 121° C, and it is a non-migrating compound or at least a non-contaminating composition.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
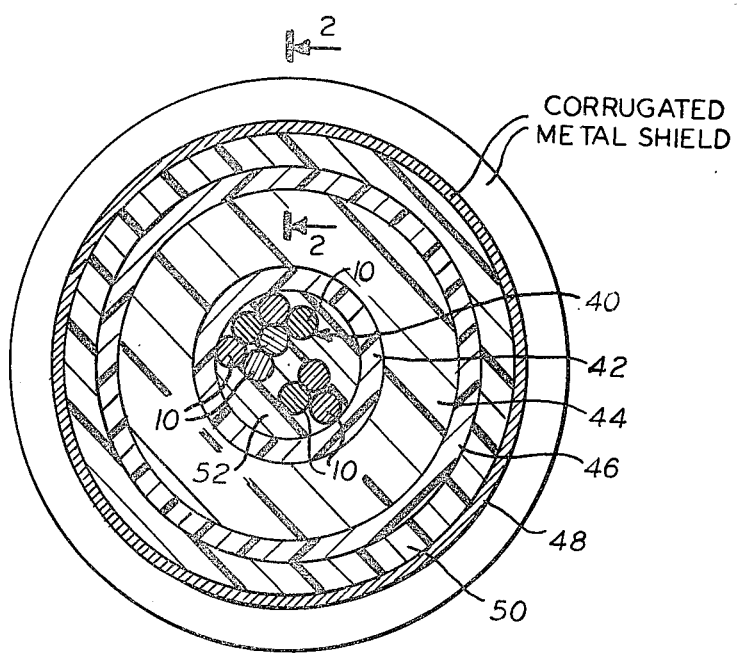
FIG. 1 is a sectional view through a high-voltage power cable filled with a polypropylene filler in accordance with this invention.

FIG. 1 shows a stranded conductor 40 to which a semi-conducting conductor shield 42 is applied. A layer of insulation 44, preferably polyethylene, surrounds the conductor shield 42; and there is a semi-conducting insulation shield 46 around the outside of the insulation 44. A corrugated metal shield 48 extends around the other structure of the cable, and there is a layer of filler compound 50 for sealing the space between the insulation shield 46 and the corrugated shield 48, as will be more fully explained in connection with FIG. 2.

The filler material that fills all spaces of the stranded conductor 40 is designated in FIG. 1 by the reference character 52. This material is amorphous polypropylene, which may be blended with low molecular weight polyisobutylene rubber or a low molecular weight copolymer of isobutylene-isoprene rubber for purposes which have been explained.

The filler material of this invention is not intended as a replacement for the conductor shield 42 or the insulation shield 46. Its primary purpose is to provide an adhesive filler that sticks to the conductor and to the inside surface of the conductor shield 42. If the conductor is stranded, as is usually the case, then the filler of this invention eliminates voids in spaces between the strands of the conductor. This filler material is also used to provide an adhesive layer between the insulation shield 46 and the metal shield 48. By having these adhesive layers, any migration of water lengthwise of the cable is prevented.

Figure 2:
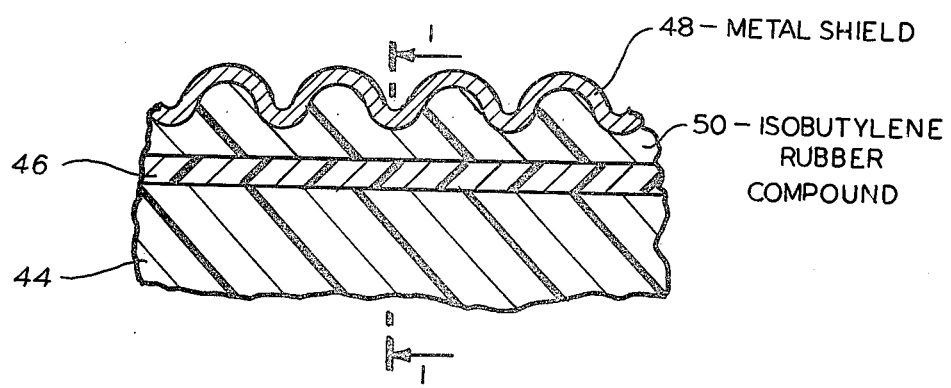
FIG. 2 is a sectional view taken on the line 2—2 of FIG. 1 and also indicating, by the section line 1—1 where the sectional view of FIG. 1 is taken with respect to the corrugated shield.

Referring to FIG. 2, the filler compound 50 is shown adhered to the insulation shield 46 and also adhered to the inside surface of the metallic shield 48. The corrugations of the shield 48 are preferably circumferential. It is intended that the filler compound fill the entire space between the metallic shield 48 and the cable core.

The preferred embodiment of the invention has been described, but changes and modifications can be made and some features can be used in different combinations without departing from the invention as defined in the claims.

What is claimed is:

1. A high-voltage, power transmission cable including a conductor, conductor shield, insulation, insulation shield and outer shield, that are subject to a wide range of temperature variations during the service conditions under which the cable is intended to be used, and a filler compound between one of the shields and a confronting face of another part of the cable to prevent migration of water longitudinally along the interface of said shield and said other part, the filler material being amorphous polypropylene adhered to both the shield and said other part at all temperatures within said range.

2. The cable described in claim 1 characterized by the amorphous polypropylene filler being applied around the conductor and to the inside surface of the outer shield and filling any clearance adjacent to said conductor and inside surface of the outer shield and through which moisture could otherwise travel longitudinally within the cable along the length of the cable.

3. The cable described in claim 1 characterized by the outer shield being a metal shield and the filler occupying the space between the inside surface of the metal shield and the surface of a layer of the cable structure that confronts the inside surface of the metal shield.

4. The cable described in claim 1 characterized by the filler having carbon, in finely divided form, distributed therethrough to make the filler semiconducting, the conductor being a stranded conductor, and the amorphous polypropylene filler material extending into depressions between adjacent strands and extending outward from the conductor for a distance sufficient to serve as a conductor shield for the cable, and the insulation of the cable being applied directly over the amorphous polypropylene insulation shield and being adhered thereto.

5. The cable described in claim 1 characterized by low molecular weight polyisobutylene rubber blended with the amorphous polypropylene to lower the temperature at which the filler becomes brittle.

6. The cable described in claim 5 characterized by the proportion of amorphous polypropylene to low molecular weight polyisobutylene rubber being at least 25 to 75 by weight.

7. The cable described in claim 5 characterized by the amorphous polypropylene and low molecular weight polyisobutylene rubber being blended in the proportions of 37½% to 62½%, respectively, and the filler having a brittle point of about −16° C.

8. The cable described in claim 5 characterized by the amorphous polypropylene and low molecular weight polyisobutylene rubber being in equal parts by weight in the blended filler.

9. The cable described in claim 1 characterized by the filler being amorphous polypropylene blended with a low molecular weight copolymer of isobutylene-isoprene rubber to lower the temperature at which the filler becomes brittle.

10. The cable described in claim 1 characterized by the amorphous polypropylene being blended with other compatible polymers for lowering the temperature at which the filler becomes brittle, and a processing aid in the filler for offsetting the impaired extrusion flow characteristics of the amorphous polypropylene by presence of the other polymers.

11. The cable described in claim 10 characterized by the processing aid being from the group consisting of hydrocarbon oil, chlorinated paraffin, isobutylene liquid plasticizers and low molecular weight polyethylene.

12. The method of preventing migration of moisture lengthwise within a high-voltage power cable which is subject to a wide range of temperatures when in use including sub-zero centigrade temperatures, which method comprises:

(a) coating a conductor of the cable by extruding over the conductor a layer of amorphous polypropylene;

(b) tenaciously adhering the filling compound to the conductor and the structure of the cable that surrounds and confronts said conductor over the full temperature range in which the cable is intended to be used; and (c) maintaining the adhesion of the filling compound to the conductor and to the confronting structure at temperatures below zero degrees centigrade.

13. The method of preventing migration of moisture lengthwise within a high-voltage power cable as described in claim 12, characterized by lowering the bottom of the temperature range by adding to the filling compound a quantity of isobutylene rubber.

* * * * *